United States Patent
Martinez et al.

(10) Patent No.: US 9,366,869 B2
(45) Date of Patent: Jun. 14, 2016

(54) THIN CURVED EYEPIECE FOR SEE-THROUGH HEAD WEARABLE DISPLAY

(71) Applicant: Google Inc., Mountain View, CA (US)

(72) Inventors: Oscar A. Martinez, Mountain View, CA (US); Ozan Cakmakci, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/537,780

(22) Filed: Nov. 10, 2014

(65) Prior Publication Data

US 2016/0131907 A1    May 12, 2016

(51) Int. Cl.
   *G02B 27/14*    (2006.01)
   *G02B 27/01*    (2006.01)

(52) U.S. Cl.
   CPC ........ *G02B 27/0172* (2013.01); *G02B 27/0101* (2013.01); *G02B 2027/013* (2013.01); *G02B 2027/0123* (2013.01)

(58) Field of Classification Search
   USPC ............................................... 359/630–635
   See application file for complete search history.

(56) References Cited

U.S. PATENT DOCUMENTS

| | | | |
|---|---|---|---|
| 4,218,111 A | 8/1980 | Withrington et al. |
| 4,220,400 A | 9/1980 | Vizenor |
| 4,560,233 A | 12/1985 | Banbury |
| 4,711,512 A | 12/1987 | Upatnieks |
| 4,799,765 A | 1/1989 | Ferrer |
| 4,968,117 A | 11/1990 | Chern et al. |
| 5,050,966 A | 9/1991 | Berman |
| 5,076,664 A | 12/1991 | Migozzi |
| 5,093,567 A | 3/1992 | Staveley |
| 5,237,455 A | 8/1993 | Bordo et al. |
| 5,257,133 A | 10/1993 | Chen |
| 5,537,253 A | 7/1996 | Cox et al. |
| 5,539,422 A | 7/1996 | Heacock et al. |

(Continued)

FOREIGN PATENT DOCUMENTS

| | | |
|---|---|---|
| EP | 0 898 726 B1 | 3/2000 |
| EP | 0 995 145 B1 | 9/2001 |

(Continued)

OTHER PUBLICATIONS

Cakmakci, O. et al., "Head-Worn Displays: A Review", IEEE, Journal of Display Technology, vol. 2, No. 3, Sep. 2006, pp. 199-216.

(Continued)

*Primary Examiner* — Mohammed Hasan
(74) *Attorney, Agent, or Firm* — Blakely Sokoloff Taylor & Zafman LLP (57) ABSTRACT

An eyepiece for a head wearable display includes a light guide component for guiding display light received at a peripheral location offset from a viewing region and emitting the display light along an eye-ward direction in the viewing region. The light guide component includes an eye-ward facing surface, a world facing surface, and a recess disposed in the world facing surface in the viewing region. The recess has a recessed surface that is discontinuous with the world facing surface. An add-on component is disposed in the recess and has a first surface mated to the recessed surface and a second surface that forms a continuous outer surface with the world facing surface. A partially reflective layer is disposed along an interface between the recessed surface and the first surface of the add-on component.

20 Claims, 6 Drawing Sheets

(56) References Cited

U.S. PATENT DOCUMENTS

| | | |
|---|---|---|
| 5,654,827 A | 8/1997 | Reichert |
| 5,694,230 A | 12/1997 | Welch |
| 5,696,521 A | 12/1997 | Robinson et al. |
| 5,715,337 A | 2/1998 | Spitzer et al. |
| 5,771,124 A | 6/1998 | Kintz et al. |
| 5,815,126 A | 9/1998 | Fan et al. |
| 5,821,911 A | 10/1998 | Jachimowicz |
| 5,844,530 A | 12/1998 | Tosaki |
| 5,880,888 A | 3/1999 | Schoenmakers et al. |
| 5,886,822 A | 3/1999 | Spitzer |
| 5,896,232 A | 4/1999 | Budd et al. |
| 5,923,476 A | 7/1999 | Heffner |
| 5,943,171 A | 8/1999 | Budd et al. |
| 5,949,583 A | 9/1999 | Rallison et al. |
| 5,995,071 A | 11/1999 | Mertz |
| 6,005,714 A | 12/1999 | Welch |
| 6,023,372 A | 2/2000 | Spitzer et al. |
| 6,057,966 A | 5/2000 | Carroll et al. |
| 6,091,546 A | 7/2000 | Spitzer |
| 6,094,241 A | 7/2000 | Yamazaki |
| 6,111,701 A | 8/2000 | Brown |
| 6,147,807 A | 11/2000 | Droessler et al. |
| 6,172,657 B1 | 1/2001 | Kamakura et al. |
| 6,201,629 B1 | 3/2001 | McClelland et al. |
| 6,204,974 B1 | 3/2001 | Spitzer |
| 6,204,975 B1 | 3/2001 | Watters et al. |
| 6,222,677 B1 | 4/2001 | Budd et al. |
| 6,236,509 B1 | 5/2001 | Grandjean et al. |
| 6,236,511 B1 | 5/2001 | Brown |
| 6,330,118 B1 | 12/2001 | Daschner et al. |
| 6,349,001 B1 | 2/2002 | Spitzer |
| 6,349,004 B1 | 2/2002 | Fischer et al. |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,396,639 B1 | 5/2002 | Togino et al. |
| 6,462,882 B2 | 10/2002 | Chen et al. |
| 6,466,471 B1 | 10/2002 | Bhattacharyya |
| 6,538,799 B2 | 3/2003 | McClelland et al. |
| 6,618,099 B1 | 9/2003 | Spitzer |
| 6,690,516 B2 | 2/2004 | Aritake et al. |
| 6,701,038 B2 | 3/2004 | Rensing et al. |
| 6,724,354 B1 | 4/2004 | Spitzer et al. |
| 6,738,535 B2 | 5/2004 | Kanevsky et al. |
| 6,747,611 B1 | 6/2004 | Budd et al. |
| 6,760,169 B2 | 7/2004 | Takahashi et al. |
| 6,825,987 B2 | 11/2004 | Repetto et al. |
| 6,829,095 B2 | 12/2004 | Amitai |
| 6,847,488 B2 | 1/2005 | Travis |
| 6,879,443 B2 | 4/2005 | Spitzer et al. |
| 6,961,162 B2 | 11/2005 | Nakamura et al. |
| 7,057,814 B2 | 6/2006 | Boyd et al. |
| 7,095,562 B1 | 8/2006 | Peng et al. |
| 7,119,965 B1 | 10/2006 | Rolland et al. |
| 7,145,726 B2 | 12/2006 | Geist |
| 7,158,096 B1 | 1/2007 | Spitzer |
| 7,205,960 B2 | 4/2007 | David |
| 7,210,803 B2 | 5/2007 | Matsunaga et al. |
| 7,230,766 B2 | 6/2007 | Rogers |
| 7,242,527 B2 | 7/2007 | Spitzer et al. |
| 7,391,573 B2 | 6/2008 | Amitai |
| 7,411,637 B2 | 8/2008 | Weiss |
| 7,450,310 B2 | 11/2008 | McGuire |
| 7,457,040 B2 | 11/2008 | Amitai |
| 7,542,209 B2 | 6/2009 | McGuire, Jr. et al. |
| 7,566,863 B2 | 7/2009 | Chang et al. |
| 7,576,916 B2 | 8/2009 | Amitai |
| 7,577,326 B2 | 8/2009 | Amitai |
| 7,586,686 B1 | 9/2009 | Hall |
| 7,595,480 B2 | 9/2009 | Kress |
| 7,595,933 B2 | 9/2009 | Tang |
| 7,637,617 B2 | 12/2009 | Liu et al. |
| 7,643,214 B2 | 1/2010 | Amitai |
| 7,663,805 B2 | 2/2010 | Zaloum et al. |
| 7,672,055 B2 | 3/2010 | Amitai |
| 7,715,103 B2 | 5/2010 | Sprague et al. |
| 7,724,441 B2 | 5/2010 | Amitai |
| 7,724,442 B2 | 5/2010 | Amitai |
| 7,724,443 B2 | 5/2010 | Amitai |
| 7,821,715 B2 | 10/2010 | Suzuki et al. |
| 7,843,403 B2 | 11/2010 | Spitzer |
| 7,900,068 B2 | 3/2011 | Weststrate et al. |
| 8,004,765 B2 | 8/2011 | Amitai |
| 8,212,859 B2 | 7/2012 | Tang et al. |
| 8,294,994 B1 | 10/2012 | Kelly |
| 8,336,333 B2 | 12/2012 | Ushigome |
| 8,384,999 B1 | 2/2013 | Crosby et al. |
| 8,411,365 B2 | 4/2013 | Saito |
| 8,471,967 B2 | 6/2013 | Miao et al. |
| 8,488,246 B2 | 7/2013 | Border et al. |
| 8,665,178 B1 | 3/2014 | Wang |
| 8,760,762 B1 | 6/2014 | Kelly et al. |
| 8,964,298 B2 * | 2/2015 | Haddick ................ G06F 3/013 359/630 |
| 2002/0015116 A1 | 2/2002 | Park |
| 2002/0167733 A1 | 11/2002 | Roest |
| 2002/0186179 A1 | 12/2002 | Knowles |
| 2003/0090439 A1 | 5/2003 | Spitzer et al. |
| 2003/0107816 A1 | 6/2003 | Takagi et al. |
| 2004/0190150 A1 | 9/2004 | Nagaoka |
| 2005/0174651 A1 | 8/2005 | Spitzer et al. |
| 2006/0192306 A1 | 8/2006 | Giller et al. |
| 2006/0192307 A1 | 8/2006 | Giller et al. |
| 2006/0215244 A1 | 9/2006 | Yosha et al. |
| 2007/0070859 A1 | 3/2007 | Hirayama |
| 2008/0219025 A1 | 9/2008 | Spitzer et al. |
| 2008/0239422 A1 | 10/2008 | Noda |
| 2009/0067057 A1 | 3/2009 | Sprague et al. |
| 2009/0122414 A1 | 5/2009 | Amitai |
| 2010/0046070 A1 | 2/2010 | Mukawa |
| 2010/0046075 A1 | 2/2010 | Powell et al. |
| 2010/0079356 A1 | 4/2010 | Hoellwarth |
| 2010/0103078 A1 | 4/2010 | Mukawa et al. |
| 2010/0149073 A1 | 6/2010 | Chaum et al. |
| 2010/0278480 A1 | 11/2010 | Vasylyev |
| 2011/0149201 A1 | 6/2011 | Powell et al. |
| 2011/0193814 A1 | 8/2011 | Gay et al. |
| 2011/0194163 A1 | 8/2011 | Shimizu et al. |
| 2011/0213664 A1 | 9/2011 | Osterhout et al. |
| 2011/0221656 A1 | 9/2011 | Haddick et al. |
| 2012/0162549 A1 | 6/2012 | Gao et al. |
| 2012/0212398 A1 | 8/2012 | Border et al. |
| 2012/0212399 A1 | 8/2012 | Border et al. |
| 2012/0249797 A1 | 10/2012 | Haddick et al. |
| 2012/0293548 A1 | 11/2012 | Perez et al. |
| 2013/0033756 A1 | 2/2013 | Spitzer et al. |
| 2013/0101253 A1 * | 4/2013 | Popovich ............ G02B 27/017 385/37 |
| 2013/0127980 A1 | 5/2013 | Haddick et al. |
| 2013/0229712 A1 | 9/2013 | Kress |
| 2014/0104692 A1 | 4/2014 | Bickerstaff et al. |

FOREIGN PATENT DOCUMENTS

| | | |
|---|---|---|
| EP | 1 930 762 A1 | 6/2008 |
| EP | 1 465 003 B1 | 12/2008 |
| GB | 2 272 980 A | 6/1994 |
| JP | 2001-066543 A | 3/2001 |
| JP | 2008-122511 A | 5/2008 |
| JP | 2008-268846 A | 11/2008 |
| JP | 4550184 B2 | 9/2010 |
| WO | WO 96/05533 A1 | 2/1996 |
| WO | WO 2007/065995 A1 | 6/2007 |
| WO | WO 2009/153446 A2 | 12/2009 |
| WO | WO 2010/097439 A1 | 9/2010 |
| WO | WO 2013/112705 A1 | 8/2013 |
| WO | WO 2013/175465 A1 | 11/2013 |

OTHER PUBLICATIONS

Mukawa, H. et al., "8.4: *Distinguished Paper*: A Full Color Eyewear Display using Holographic Planar Waveguides", SID Symposium Digest of Technical Papers, May 2008, vol. 39, Issue 1, pp. 89-92.

(56) References Cited

OTHER PUBLICATIONS

Cakmakci, O. et al. "Design of a Freeform Single-Element Head-Worn Display", Proc. of SPIE vol. 7618, 761803, 2010, 6 pages.
Kress, B. et al., "Low Cost Replicable Plastic HUD combiner element", Photonics in the Transportation Industry: Auto to Aerospace II, Proc. SPIE vol. 7314, 73140I, Apr. 2009, 8 pages.
Kress, B. et al., "Digital combiner achieves low cost and high reliability for head-up display applications", SPIE Newsroom. DOI: 10.1117/2.1200904.1599, May 2009, 3 pages.
Kress, B. et al., "Applied Digital Optics: From Micro-optics to Nanophotonics, Chapter 5: Digital Diffractive Optics: Analytic Type", 40 pages, 2009, John Wiley & Sons, Ltd.
Kress, B. et al., "Applied Digital Optics: From Micro-optics to Nanophotonics, Chapter 12: Digital Optics Fabrication Techniques", 74 pages, 2009, John Wiley & Sons, Ltd.
Kress, B. et al., "Applied Digital Optics: From Micro-optics to Nanophotonics, Chapter 14: Replication Techniques for Digital Optics", 27 pages, 2009, John Wiley & Sons, Ltd.
Kress, B. et al., "Applied Digital Optics: From Micro-optics to Nanophotonics, Chapter 16: Digital Optics Application Pools", 60 pages, 2009, John Wiley & Sons, Ltd.
Levola, T., "Diffractive Optics for Virtual Reality Displays," Academic Dissertation, Joensuu 2005, University of Joensuu, Department of Physics, Vaisala Laboratory, 26 pages.

Kent Optronics, Liquid Crystal for Photonics, "Switchable Mirror/Switchable Glass", retrieved from Internet Dec. 16, 2013, 1 page, http://www.kentoptronics.com/switchable.html .
Kent Optronics, Inc., Liquid Crystals for Photonics, "Liquid Crystal Switchable Mirror", 2 pages, http://www.kentoptronics.com, prior to Mar. 12, 2014.
Cakmakci, O. et al., "See-Through Eyepiece for Head Wearable Display", U.S. Appl. No. 14/135,284, filed Dec. 19, 2013, whole document.
Cakmakci, O. et al. "Eyepiece for Head Wearable Display Using Partial and Total Internal Reflections", U.S. Appl. No. 14/139,277, filed Dec. 23, 2013, whole document.
Luttmann, A.M. et al., "Eyepiece With Switchable Reflector for Head Wearable Display", U.S. Appl. No. 14/209,995, filed Mar. 13, 2014, whole document.
Martinez, M. et al., "Segmented Diffractive Optical Elements for a Head Wearable Display", U.S. Appl. No. 13/930,845, filed Jun. 28, 2013, whole document.
PCT/US2015/055110—PCT International Search Report and Written Opinion, mailed Jan. 26, 2016, 13 pages.
U.S. Appl. No. 14/209,995—Non-Final Office Action, issued Oct. 22, 2015, 11 pages.

\* cited by examiner

$$sag(x,y) = \frac{(1/R)(x^2+y^2)}{1+\sqrt{1-(1/R^2)(x^2+y^2)}} + \sum C_{m,n} x^m y^n$$

$C_{2,0} = X2$ $C_{1,1} = X1Y1$ $C_{0,2} = Y2$ etc...

COEFFICIENTS TABLE

| Surface | R | Y2 | X3 | XY2 | X4 |
|---|---|---|---|---|---|
| S1 | -52.0 | 0 | 0 | 0 | 0 |
| S2 | -44.3 | 5.4E-04 | 3.5E-05 | 1.3E-05 | -5.9E-07 |
| S3 | -56.0 | 0 | 0 | 0 | 0 |
| S4 | Infinity | 0 | 0 | 0 | 0 |

COORDINATES TABLE

| Surface | X | Y | Z | Alpha | Beta | Gamma |
|---|---|---|---|---|---|---|
| S1 | 0 | 0 | 0 | 0 | 0 | 0 |
| S2 | 0 | 0 | 2.0 | 0 | 14.2 | 0 |
| S3 | 0 | 0 | 4.0 | 0 | 0 | 0 |
| S4 | 25.0 | 0 | -5.0 | 0 | 32.7 | 0 |

FIG. 3

THIN CURVED EYEPIECE FOR SEE-THROUGH HEAD WEARABLE DISPLAY

TECHNICAL FIELD

This disclosure relates generally to the field of optics, and in particular but not exclusively, relates to eyepieces for head wearable displays.

BACKGROUND INFORMATION

A head mounted display ("HMD") or head wearable display is a display device worn on or about the head. HMDs usually incorporate some sort of near-to-eye optical system to create a magnified virtual image placed a few meters in front of the user. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD typically includes some form of see-through eyepiece and can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, field of view, and efficiency of conventional optical systems used to implemented existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system and apparatus for an eyepiece of a head wearable display that leverages partial and total internal reflections are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
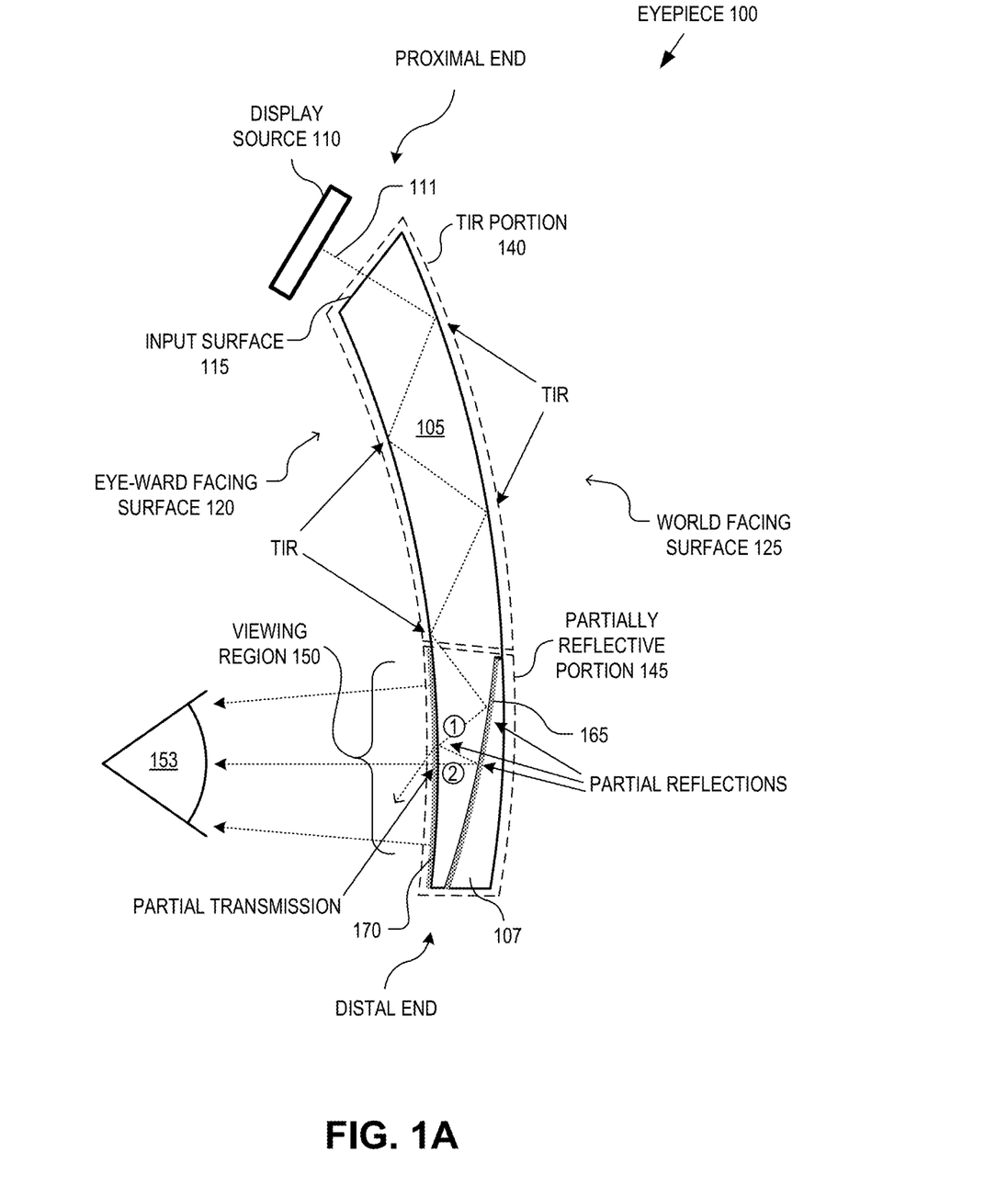
FIG. 1A is a plan view illustration of an eyepiece for a head wearable display, in accordance with an embodiment of the disclosure.
Figure 1B:
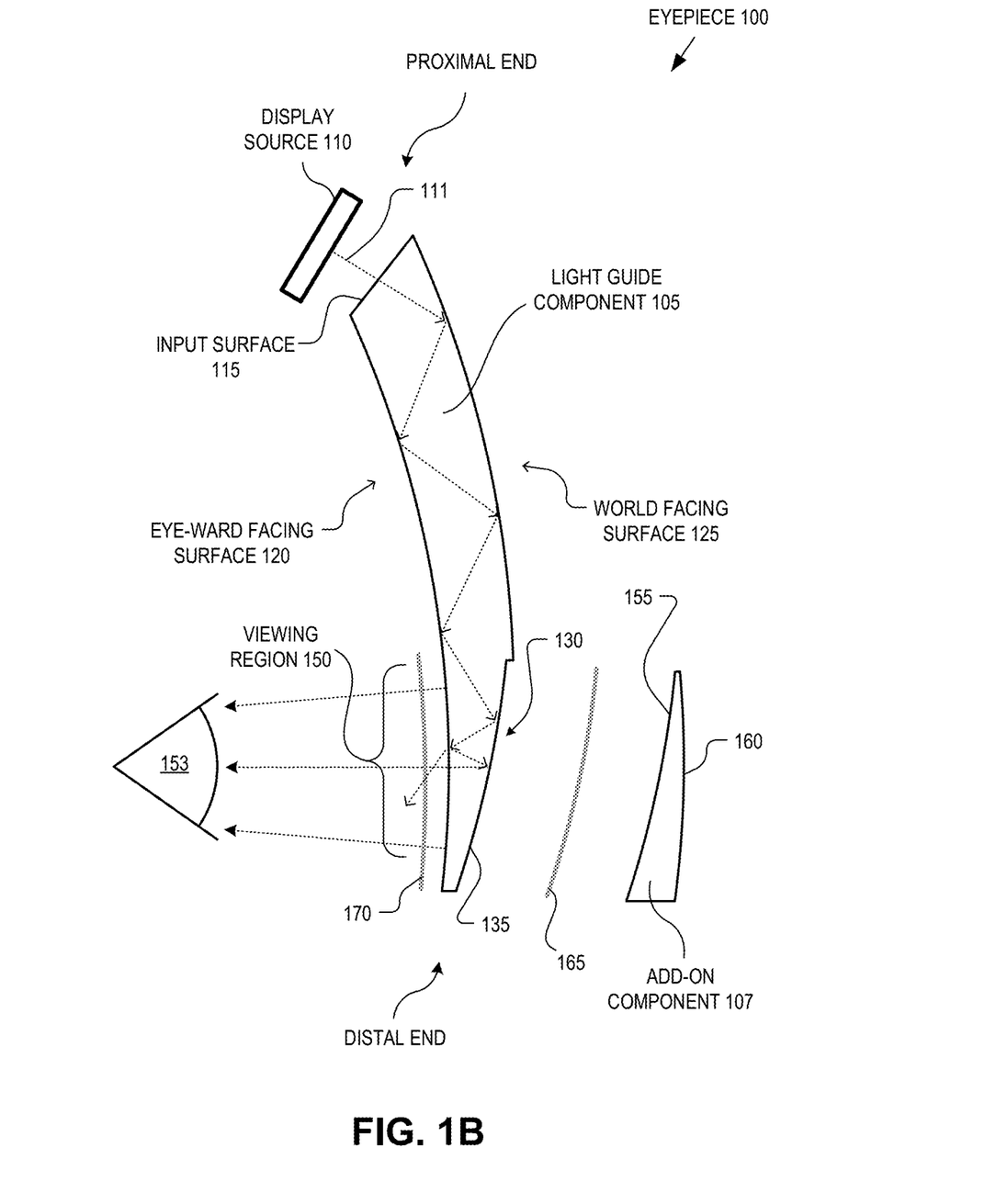
FIG. 1B is an exploded plan view illustration of the eyepiece for a head wearable display, in accordance with an embodiment of the disclosure.

FIGS. 1A & 1B illustrate an eyepiece 100 for a head wearable display, in accordance with an embodiment of the disclosure. FIG. 1A is a plan view illustration while FIG. 1B is an exploded plan view illustration of the same. The illustrated embodiment of eyepiece 100 includes a light guide component 105, an add-on component 107, and a display source 110. The illustrated embodiment of light guide component 105 includes an input surface 115, an eye-ward facing surface 120, a world facing surface 125, a recess 130 (FIG. 1B), a recess surface 135, a total internal reflection ("TIR") portion 140 (FIG. 1A), a partially reflective portion 145, and a viewing region 150. The add-on component 107 includes an inner surface 155 and an external surface 160. In the illustrated embodiment, a partially reflective layer 165 is disposed along the interface between recess surface 135 and inner surface 155 and a partially reflective coating 170 is disposed along eye-ward facing surface 120.

In TIR portion 140 the light path of display light 111 is controlled such that reflections at eye-ward and world facing surfaces 120 and 125 are achieved via TIR. In partially reflective portion 145, the angles of incidence of the light path on eye-ward facing surface 120 and recessed surface 135 are less than the critical angle such that TIR no longer occurs so leaky, partial reflections are relied upon to guide display light 111. These partial reflections may be achieved via a variety of different techniques. In some embodiments, partially reflective layer 165 and partially reflective coating 170 provide the leaky reflective boundaries for guiding display light 111. In other embodiments, partially reflective coating 170 is omitted and Fresnel reflections are relied upon in partially reflective portion 145.

In the illustrated embodiment, partially reflective layer 165 and partially reflective coating 170 are disposed on eye-ward facing side 120 and world facing side 125, respectively, within partially reflective portion 145. In other embodiments, partially reflective coating 170 may coat the entire eye-ward facing surface 120, though the coating is effectively unused along TIR portion 140 since internal reflections occur due to TIR. Partially reflective layer 165 and partially reflective coating 170 may be implemented as conventional beam splitters (e.g., a non-polarized beam splitter film). The splitting ratio may be selected according to design needs, but in one embodiment is implemented as a 50/50 beam splitter.

In other embodiments, partially reflective layer 165 and partially reflective coating 170 are implemented as polarizing beam splitters ("PBS"). In PBS embodiments, display source 110 outputs polarized light with a polarization selected to substantially reflect off of the partially reflective layer/coating. A PBS design can serve to increase the efficiency of the optical system. However, when implemented with a PBS, it can be beneficial to use low stress materials (e.g., low stress plastic or glass) to reduce the influence of birefringence on the optical design. Polarized display light may be generated via a liquid crystal display ("LCD"), a liquid crystal on silicon ("LCoS") display, using external polarization filters, or otherwise.

In yet other embodiments, partially reflective coating 170 is implemented using a multi-layer interference coating that is angle sensitive to substantially reflect display light 111 having a first angle of incidence while substantially transmitting display light 111 having a second angle of incidence. By limiting the number of partial reflections on partially reflective coating 170 to only two reflections, an angle sensitive design that substantially reflects upon the first incidence and substantially transmits upon the second incidence can be designed to increase optical efficiency. For example, referring to FIG. 1A, after display light 111 enters partially reflective portion 145, its first angle of incident on partially reflective coating 170 at location (1) results in a greater than 50% reflection (e.g., 80% reflection) of display light 111. The second angle of incident on partially reflective coating 170 at location (2) is closer to normal and results in a greater than 50% transmission (e.g., 80% transmission) of display light 111. In one embodiment, the multi-layer interference coating is a triple notch filter specifically tuned to reflect/transmit narrow bands of red, green, and blue light.

In yet other embodiments, partially reflective coating 170 is omitted and eye-ward facing surface 120 is not coated with a partially reflective layer. Instead, Fresnel reflections are used to partially reflect display light 111. Fresnel reflections leverage the refractive index boundary at eye-ward facing surface 120. However, due to the polarization dependence of Fresnel reflections, low stress materials (e.g., low stress plastics or glass) should be used to reduce the influence of birefringence on the optical design.

During operation, display source 110 emits display light 111 from a peripheral location offset from viewing region 150 into light guide component 105. Display source 110 may be implemented using a variety of different display technologies including a LCD, an organic light emitting diode ("OLED") display, a LCoS display, or otherwise. Display light 111 may include computer generated images.

Display light 111 is incident into light guide component 105 through input surface 115. In the illustrated embodiment, input surface 115 is a flat surface without optical power. In other embodiments, input surface 115 may have a curvature with optical power to apply a lensing function to display light 111.

After display light 111 enters into light guide component 105 through input surface 115, it enters into TIR portion 140. Within TIR portion 140 of light guide component 105, the angles of incidence of the optical path are such that display light 155 internally reflects off of eye-ward facing surface 120 and world facing surface 125 via TIR. TIR is a substantially non-lossy reflection and therefore optically efficient. In the illustrated embodiment, the initial reflection is off of world facing surface 125, while a total of four TIR reflections occur within TIR portion 140. In other embodiments, more or less TIR reflections may be implemented. Higher number of TIR reflections may be achieved by selecting materials with a high index of refraction. Higher index material brings the critical angle closer to normal and therefore TIR reflections can be sustained further along the length of light guide component 105 before leaky reflections are used.

Display light 111 is guided to partially reflective portion 145 via TIR reflections within TIR portion 140. Once display light 111 enters into partially reflective portion 145, in the illustrated embodiment, partially reflective layer 165 and partially reflective coating 170 sustain the reflections. These reflections will typically be lossy due to the inherent nature of partially reflective coatings/layers. However, the partially reflective layer/coating 165 and 170 permit the incident angles to approach normal before reaching an emission area on eye-ward facing surface 120 within viewing region 150. Within viewing region 150, display light 111 exits light guide component 105 along an eye-ward direction towards eye 153. In various embodiments, partially reflective portion 145 partially reflects a single ray of display light 111 three times between eye-ward facing surface 120 and recess surface 135 with a partial transmission occurring at (2). While some display light 111 exits light guide component 105 at leaky reflection (1), it does not exit along a trajectory that is seen by eye 153. Rather, the partial transmission (2) exits along the eye-ward direction.

Eye-ward facing surface 120, world facing surface 125, and recess surface 135 are curved surfaces that impart reflective optical power onto display light 111 when reflected within light guide component 105. Eye-ward facing surface 120 also imparts refractive optical power onto display light 111 as it is emitted out of light guide component 105 towards eye 153 in viewing region 150. The curvatures of these surfaces operate together to adjust the vergence of display light 111 with each successive reflection and the final refraction to magnify and virtually displace the image presented to eye 153 by display light 111. The image is virtually displaced back from eye 153 by a distance (e.g., 1 m to 10 m) that enables eye 153 to comfortably bring the near-to-eye image into focus. In other words, the curved sides of light guide component 105 operate to both transport display light 111 from a peripheral location to viewing region 150 while simultaneously collimating, or nearly collimating, the image without a separate or additional collimating lens between display source 110 and light guide component 105. This design of eyepiece 100 reduces the number of optical components and reduces its fabrication and assembly complexities.

Figure 3:
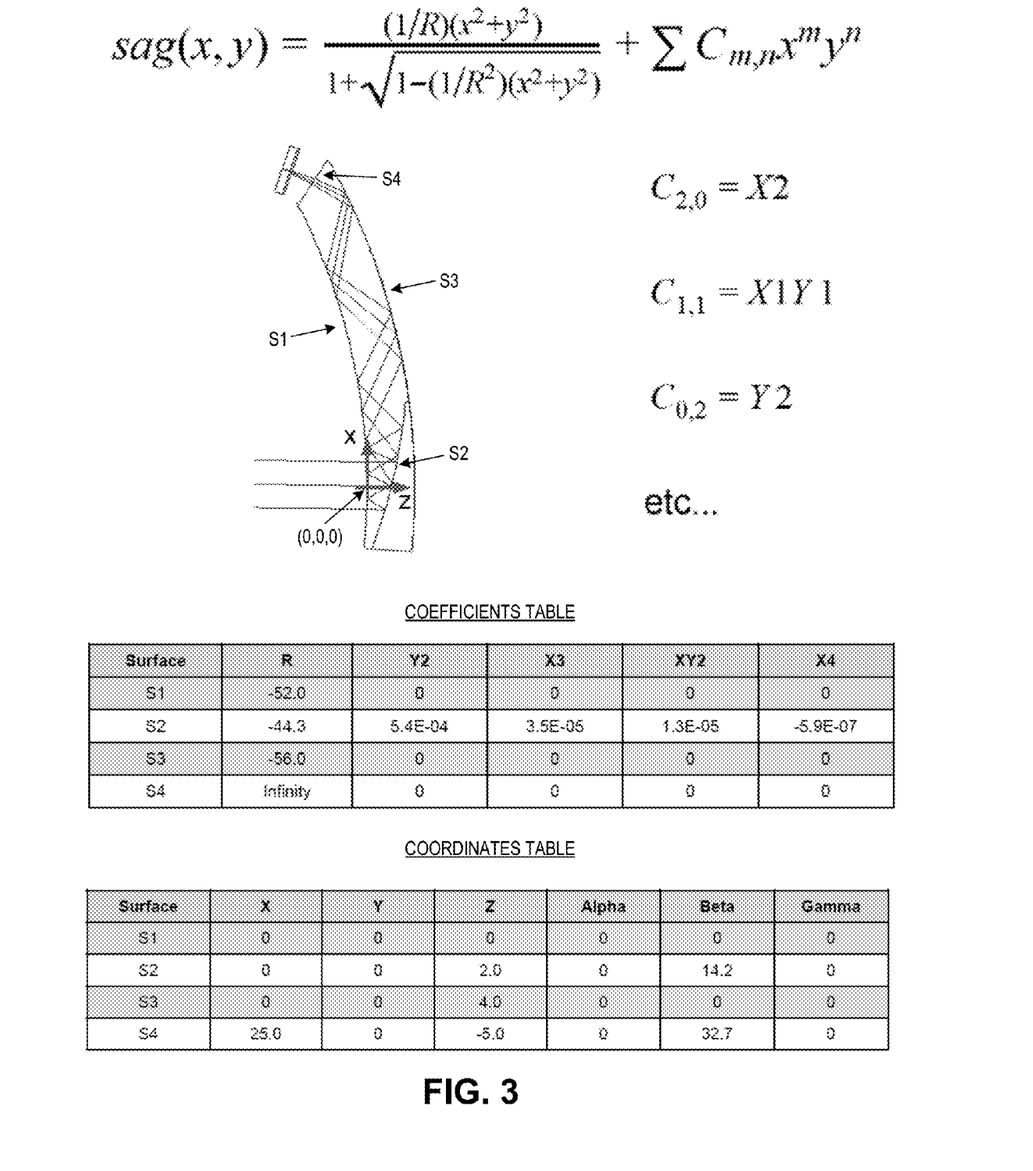
FIG. 3 provides a sag equation along with example coefficients and coordinates for characterizing the surfaces of a demonstrative eyepiece for use with a head wearable display, in accordance with an embodiment of the disclosure.

FIG. 3 presents a sag equation with example coefficient values specifying example curvatures for eye-ward facing surface 120 (S1), recess surface 135 (S2), world facing surface 125 (S3), and input surface (S4). FIG. 3 also presents example coordinates for positioning surfaces S1 through S4. Of course, other curvatures, flat surfaces, and coordinates may be implemented. In particular, although the illustrated embodiments of surfaces S1 and S3 are described a spherical surfaces, in other embodiments, one or more of these surfaces may be described as a freeform surface, a rotationally symmetric asphere surface, an anamorphic asphere surface, a toroid surface, a Zernike polynomial surface, a radial basis function surface, an x-y polynomial surface, a non-uniform rational b-spline surface, or otherwise.

In one embodiment, both eye-ward facing surface 120 and world facing surface 125 are clear surfaces that reflect display light 111 via TIR in TIR portion 140 and via partial reflections in partially reflective portion 145. Clear surfaces achieve a desirable industrial design characteristic, since eyepiece 100 will appear as a clear eyepiece to external observers. Eyepiece 100 further achieves desirable industrial design characteristics with the thickness between eye-ward and world facing surfaces 120 and 125 being approximately 4 mm thick. The illustrated design can provide a 15 degree of diagonal field of view ("FOV") with an eyebox of about 6.47 mm horizontal and 7.27 mm vertical, and an eye relief of about 18 mm. In one embodiment, eyepiece 100 is about 30 mm to 34 mm long from proximal end to distal end. Of course, other dimensions can be implemented.

Referring to FIG. 1B, the illustrated embodiment of light guide component 105 includes a recess 130 formed in the world facing surface 125 in viewing region 150. Recess 130 includes a recess surface 135 to which inner surface 155 of add-on component 107 is mated. Recess surface 135 is a discontinuous surface with world facing surface 125. In the illustrated embodiment, a recessed shoulder is formed at the discontinuity between world facing surface 125 and recess surface 135. The recess shoulder enables add-on component 107 to be fitted into recess 130 and provide a smooth, continuous outer surface while maintaining thickness for mechanical strength at the tip of add-on component 107. In other embodiments, world facing surface 125 and recess surface 135 are discontinuous surfaces that form a discontinuous intersection with each other without the recessed shoulder. Accordingly, recess surface 135 includes any surface that recedes from a continuous extension of world facing surface 125 to facilitate the addition of add-on component 107. Similarly, recess 130 may assume a variety of shapes including a slot, an alcove, a wedge, or otherwise.

Partially reflective layer 165 is disposed along the interface between recess surface 135 and inner surface 155. Partially reflective layer 165 may be coated on either surface prior to mating add-on component 107 to light guide component 105. In one embodiment, the components are bonded together using optical adhesive. Light guide component 105 and add-on component 107 may be fabricated of two different materials having the same index of refraction, or both of the same material.

Since partially reflective layer/coating 165 and 170 are only partially reflective and light guide component 105 and add-on component 107 are fabricated of optically transmissive materials (e.g., clear plastic), viewing region 150 permits at least a portion of ambient scene light to pass through to eye 153. Thus, eyepiece 100 operates as an optical combiner, which combines external scene light with display light 111 emitted through viewing portion 150 along an eye-ward direction into eye 153. In this way, eyepiece 100 is capable of displaying an augmented reality to eye 153.

As illustrated, add-on component 107 is bonded into recess 130 of light guide component 105. Inner surface 155 is designed with a curvature that smoothly mates to the curvature of recess surface 135. Furthermore, exterior surface 160 forms a smooth, continuous outer surface with world facing surface 125. In one embodiment, the outer surface (including world facing surface 125) and eye-ward facing surface 120 are spherical surfaces with complementary curvatures that substantially offset each other's optical power to ambient light passing through. In other words, the input angle of ambient scene light entering external surface 160 is substantially equivalent to the output angle of ambient scene light exiting eye-ward facing side 120. As such, eyepiece 100 passes at least a portion of ambient scene light through viewing region 150 substantially without lensing, thereby permitting the user to have a substantially undistorted view of the ambient environment in front of eyepiece 100. In other embodiments, world facing surface 125 and eye-ward facing surface 120 are surfaces with non-complementary curvatures that collectively provide corrective lensing power to passing ambient light.

As mentioned, add-on component 107 and light guide component 105 are fabricated of material(s) having the same or similar index of refraction. This serves to remove optical power at the interface between inner surface 155 and recess surface 135 for ambient scene light that passes through viewing region 150 to eye 153. However, the curvature of partially reflective layer 165 applies lensing power to the internal display light 111. Since partially reflective layer 165 has a steeper angle with greater curvature, a substantial portion of the optical power applied to display light 111 is applied by partially reflective surface 165. In some embodiments, partially reflective layer 165 can also be curved to introduce a user specific corrective prescription. In one embodiment, partially reflective surface 165 is a freeform surface.

Light guide component 105 is fabricated of a material having a higher index of refraction than air to induce TIR within TIR portion 140. Light guide component 105 may be fabricated of optical grade plastic (e.g., Zeonex E-330-R), glass, or otherwise. In one embodiment, the component is injection molded to shape and then processed to add the various optical coatings/layers discussed below. Add-on component 107 may be fabricated of the same or similar material as light guide component 105 using similar fabrication techniques. In one embodiment, add-on component 107 is fabricated of a material having a substantially similar index of refraction as light guide component 105.

The outer surfaces of eyepiece 100 may be coated with anti-fingerprint coatings. For example, in one embodiment, both eye-ward and world facing surfaces 120 and 125 in at least in TIR portion 140 are coated with an anti-fingerprint coating to reduce the impact of fingerprint oils on total internal reflection at these surfaces. Anti-fingerprint or oleophobic coatings are known in the art.

Figure 2A:
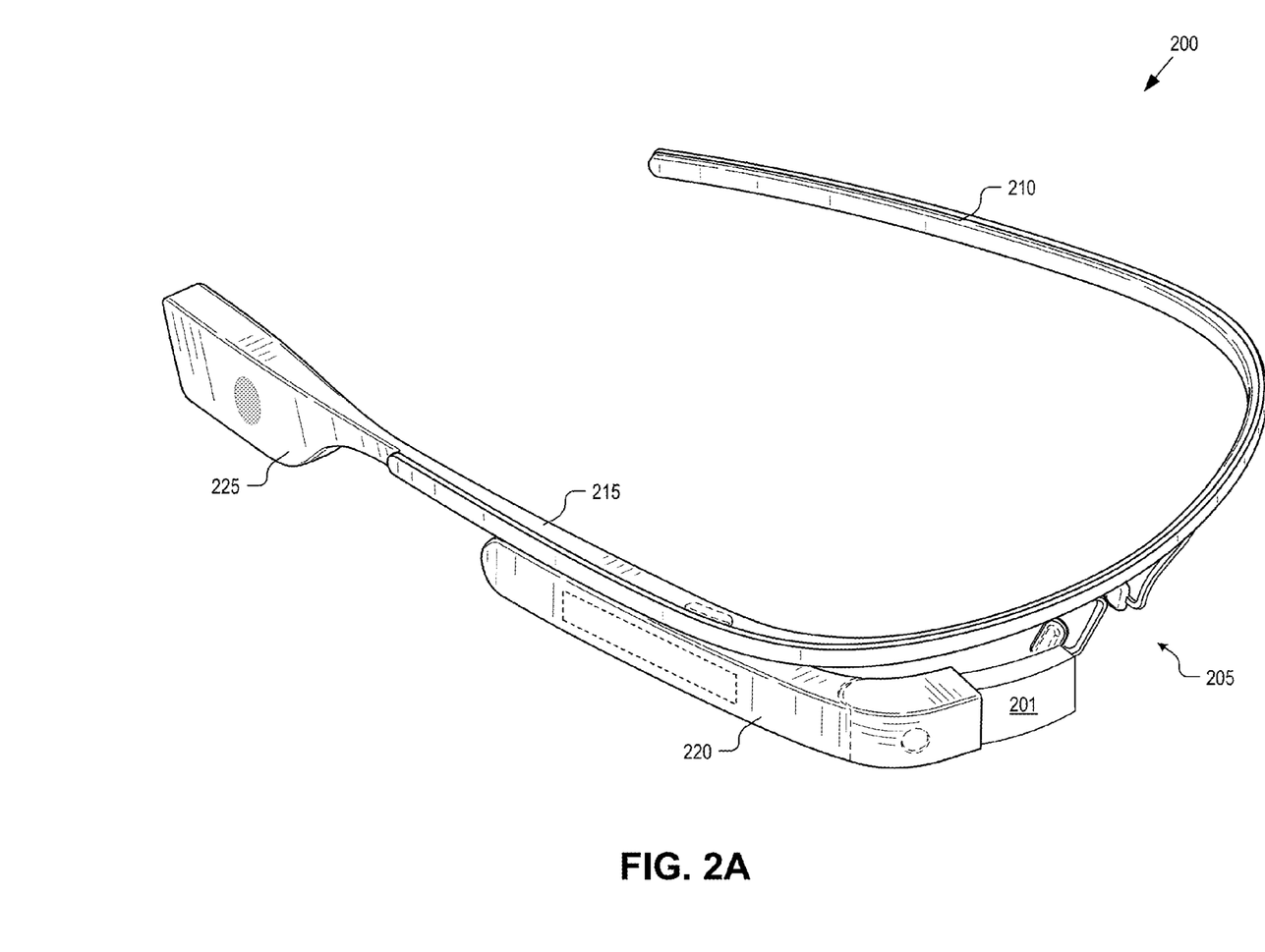
FIGS. 2A and 2B illustrate a demonstrative monocular head wearable display including a see-through eyepiece, in accordance with an embodiment of the disclosure.
Figure 2B:
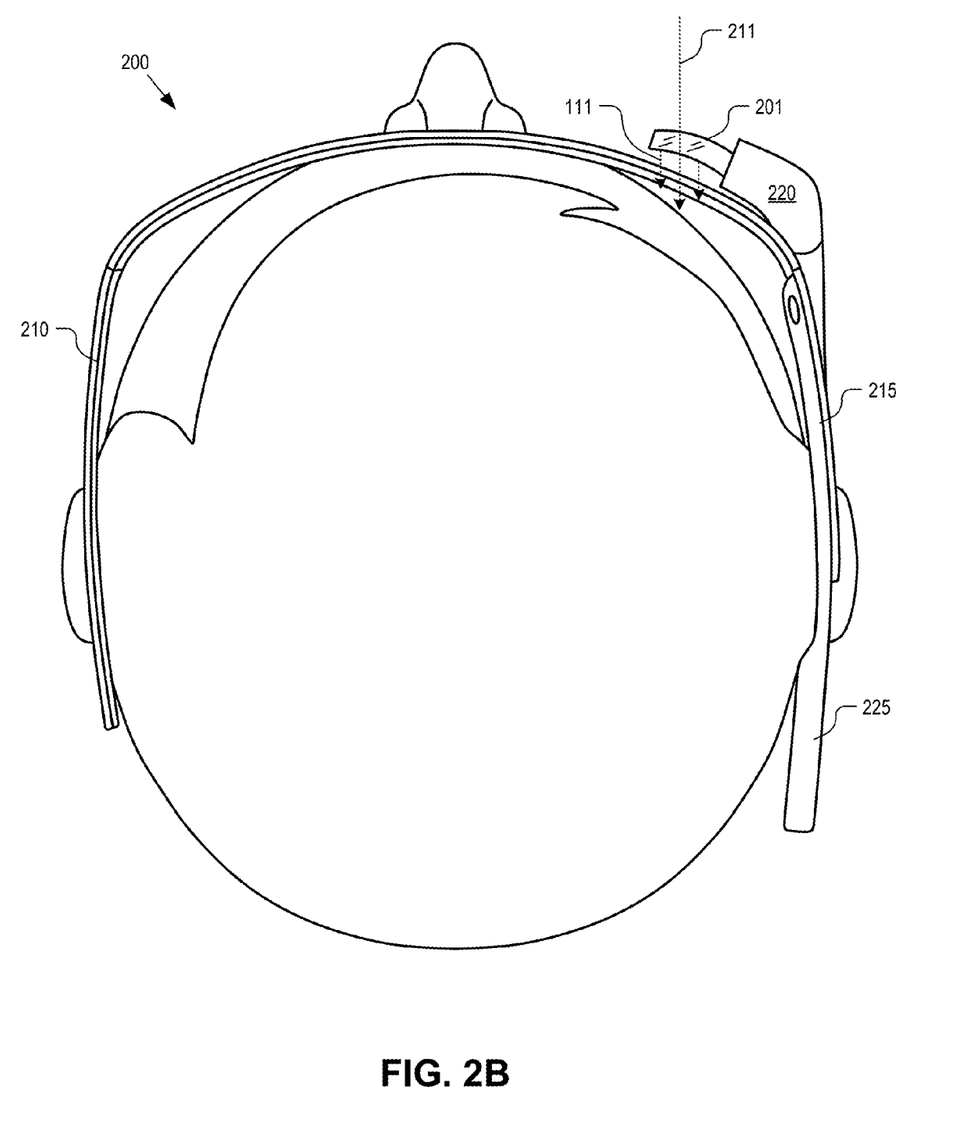

FIGS. 2A and 2B illustrate a monocular head wearable display 200 using an eyepiece 201, in accordance with an embodiment of the disclosure. FIG. 2A is a perspective view of head wearable display 200, while FIG. 2B is a top view of the same. Eyepiece 201 may be implemented with embodiments of eyepiece 100 as discussed above. Eyepiece 201 is mounted to a frame assembly, which includes a nose bridge 205, left ear arm 210, and right ear arm 215. Housings 220 and 225 may contain various electronics including a microprocessor, interfaces, one or more wireless transceivers, a battery, a camera, a speaker, a display source, etc. Although FIGS. 2A and 2B illustrate a monocular embodiment, head wearable display 200 may also be implemented as a binocular display with two eyepieces 201 each aligned with a respective eye of the user when display 200 is worn.

The see-through eyepiece 201 is secured into an eye glass arrangement so head wearable display that can be worn on the head of a user. The left and right ear arms 210 and 215 rest over the user's ears while nose bridge 205 rests over the user's nose. The frame assembly is shaped and sized to position viewing region 150 in front of an eye of the user. Other frame assemblies having other shapes may be used (e.g., traditional eyeglasses frame, a single contiguous headset member, a headband, goggles type eyewear, etc.).

Figure 2C:
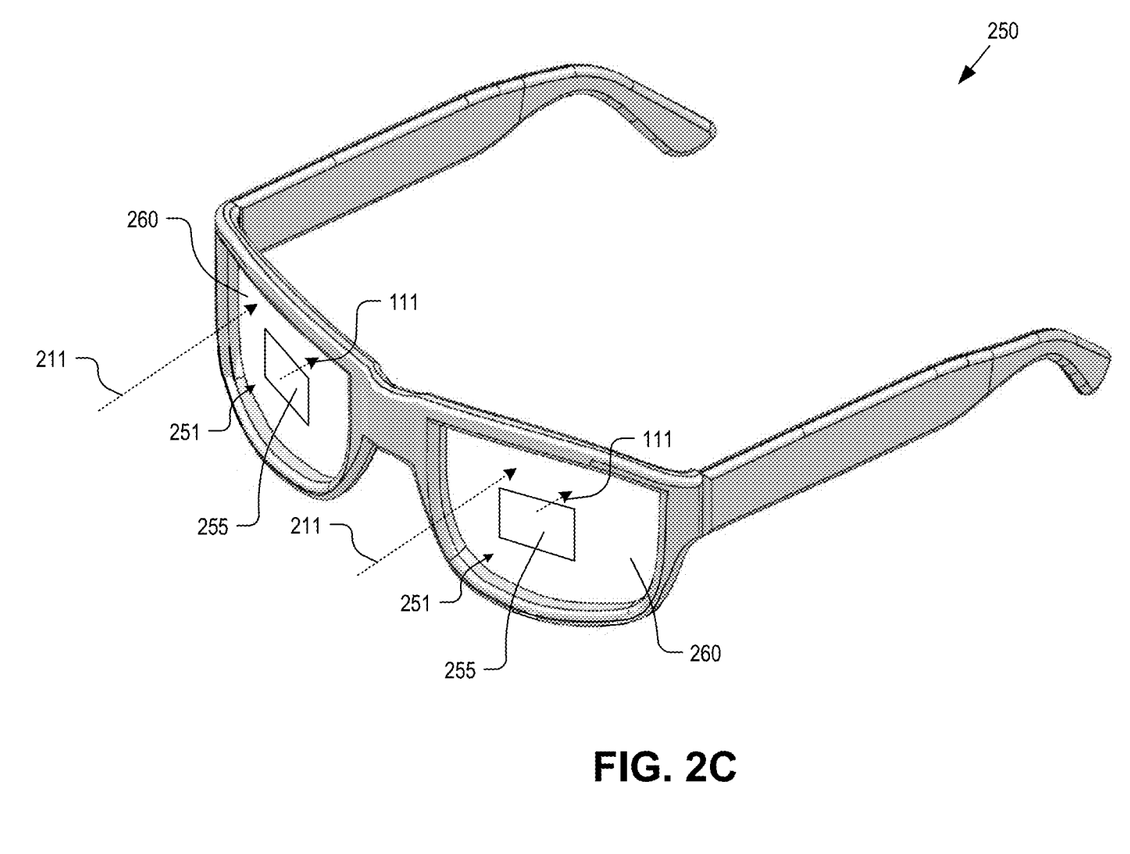
FIG. 2C illustrates a demonstrative binocular head wearable display including see-through eyepieces, in accordance with an embodiment of the disclosure.

As mentioned, FIGS. 2A and 2B illustrate a monocular embodiment with a compact see-through eyepiece that only covers a portion of the user's field of view. In other embodiments, the eye-ward facing and world facing surfaces of the see-through eyepiece can be extended to form full eyeglass lenses in a binocular frame. FIG. 2C illustrates a binocular head wearable display 250 including two see-through eyepieces 251 that extend across a substantial portion of the user's field of view. Add-on components 255 may be disposed in the user's central vision to cover a large portion of their field of view. Display light 11 may be launched into eyepieces 215 at the peripheral temple regions and guided towards add-on components 255 via TIR, as described above. Add-on components 255 may be bonded into recesses disposed within the curved light guide component 260 of each see-through eyepiece 251. These full eyeglass lenses may be implemented as prescriptive or non-prescriptive lenses, also as discussed above.

The illustrated embodiment of head wearable displays 200 or 250 are capable of displaying an augmented reality to the user. Eyepieces 201 or 251 permit the user to see a real world image via ambient scene light 211. Left and right display images (binocular embodiment illustrated in FIG. 2C) may be generated by display sources 110 mounted in peripheral corners outside the user's central vision. Display light 111 is seen by the user as a virtual image superimposed over ambient scene light 211 as an augmented reality. As mentioned above, in some embodiments, the outer surfaces of eyepieces 201 or 251 may have none complementary curvatures to impart prescriptive correction on ambient scene light 211.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eyepiece for a head wearable display, the eyepiece comprising:
    a curved light guide component for guiding display light received at a peripheral location offset from a viewing region and emitting the display light along an eye-ward direction in the viewing region, the curved light guide component including:
        an eye-ward facing surface;
        a world facing surface; and
        a recessed surface that is discontinuous with the world facing surface;
    an add-on component having a first surface mated to the recessed surface and a second surface that forms a continuous outer surface with the world facing surface of the light guide component, wherein the eye-ward facing, world facing, recessed, first, second, and outer surfaces are all curved surfaces; and
    a partially reflective layer disposed along an interface between the recessed surface and the first surface of the add-on component.

2. The eyepiece of claim 1, wherein the curved light guide component comprises:
    an input surface oriented to receive the display light into the curved light guide component at the peripheral location; and
    a total internal reflection ("TIR") portion disposed proximal to the input surface to guide the display light received through the input surface using TIR off of the eye-ward and world facing surfaces.

3. The eyepiece of claim 2, wherein the curved light guide component comprises:
    a partially reflective portion disposed distal to the input surface to receive the display light from the TIR portion and to guide the display light via leaky partial reflections between the eye-ward facing surface and the partially reflective layer.

4. The eyepiece of claim 3, wherein the display light is guided along a light path within the curved light guide component that reflects the display light four times via TIR and three times via partial reflections before exiting the curved light guide component along the eye-ward direction.

5. The eyepiece of claim 3, further comprising:
    a partially reflective coating disposed on the eye-ward facing surface and extending along at least the partially reflective portion.

6. The eyepiece of claim 5, wherein the partially reflective coating comprises a beam splitter.

7. The eyepiece of claim 5, wherein the partially reflective coating comprises a multi-layer interference coating that is angle sensitive to substantially reflect the display light upon a first incidence after the display light enters the partially reflective portion from the TIR portion and to substantially transmit the display light upon a second incidence after the display light enters the partially reflective portion.

8. The eyepiece of claim 1, wherein the curved light guide component and the add-on component have substantially equivalent indexes of refraction.

9. The eyepiece of claim 8, wherein the curved light guide component and the add-on component are transparent and the viewing region is see-through.

10. The eyepiece of claim 1, wherein the eye-ward facing surface and the world facing surface are spherical surfaces with complementary curvatures that substantially offset each other's optical power when passing ambient light.

11. The eyepiece of claim 1, wherein the eye-ward facing surface and the world facing surfaces are spherical surfaces with non-complementary curvatures that collectively provide corrective lensing power to ambient light.

12. The eyepiece of claim 1, wherein the recessed surface has a freeform curvature that is different from the complementary curvatures of the eye-ward facing surface and the world facing surface.

13. A head wearable display, comprising:
    a display source to generate display light at a peripheral location;
    a light guide component for guiding the display light to a viewing region offset from the peripheral location and emitting the display light along an eye-ward direction in the viewing region, the light guide component including:
        an eye-ward facing surface;
        a world facing surface; and
        a recess disposed in the world facing surface in the viewing region, the recess having a recessed surface that is discontinuous with the world facing surface;
    an add-on component disposed in the recess, the add-on component having a first surface mated to the recessed surface and a second surface that forms a continuous outer surface with the world facing surface of the light guide component, wherein the eye-ward facing, world facing, recessed, first, second, and outer surfaces are all curved surfaces;
    a partially reflective layer disposed along an interface between the recessed surface and the first surface of the add-on component; and
    a frame assembly to support the light guide component and the display source for wearing on a head of a user with the viewing region positioned in front of an eye of the user.

14. The head wearable display of claim 13, wherein the light guide component comprises:
   an input surface oriented to receive the display light into the light guide component at the peripheral location; and
   a total internal reflection ("TIR") portion disposed proximal to the input surface to guide the display light received through the input surface using TIR off of the eye-ward and world facing surfaces.

15. The head wearable display of claim 14, wherein the light guide component comprises:
   a partially reflective portion disposed distal to the input surface to receive the display light from the TIR portion and to guide the display light via leaky partial reflections between the eye-ward facing surface and the partially reflective layer.

16. The head wearable display of claim 15, wherein the display light is guided along a light path within the light guide component that reflects the display light four times via TIR and three times via partial reflections before exiting the light guide component along the eye-ward direction.

17. The head wearable display of claim 15, further comprising:
   a partially reflective coating disposed on the eye-ward facing surface and extending along at least the partially reflective portion.

18. The head wearable display of claim 17, wherein the partially reflective coating comprises a beam splitter.

19. The head wearable display of claim 17, wherein the partially reflective coating comprises a multi-layer interference coating that is angle sensitive to substantially reflect the display light upon a first incidence after the display light enters the partially reflective portion from the TIR portion and to substantially transmit the display light upon a second incidence after the display light enters the partially reflective portion.

20. The head wearable display of claim 13, wherein the light guide component and the add-on component have substantially equivalent indexes of refraction and wherein the light guide component and the add-on component are transparent and the viewing region is see-through.

* * * * *